July 3, 1956           O. H. BANKER           2,752,892
FOLLOW-UP TYPE BOOSTER WITH REACTION TO ACTUATOR
Filed Aug. 10, 1950           2 Sheets-Sheet 1
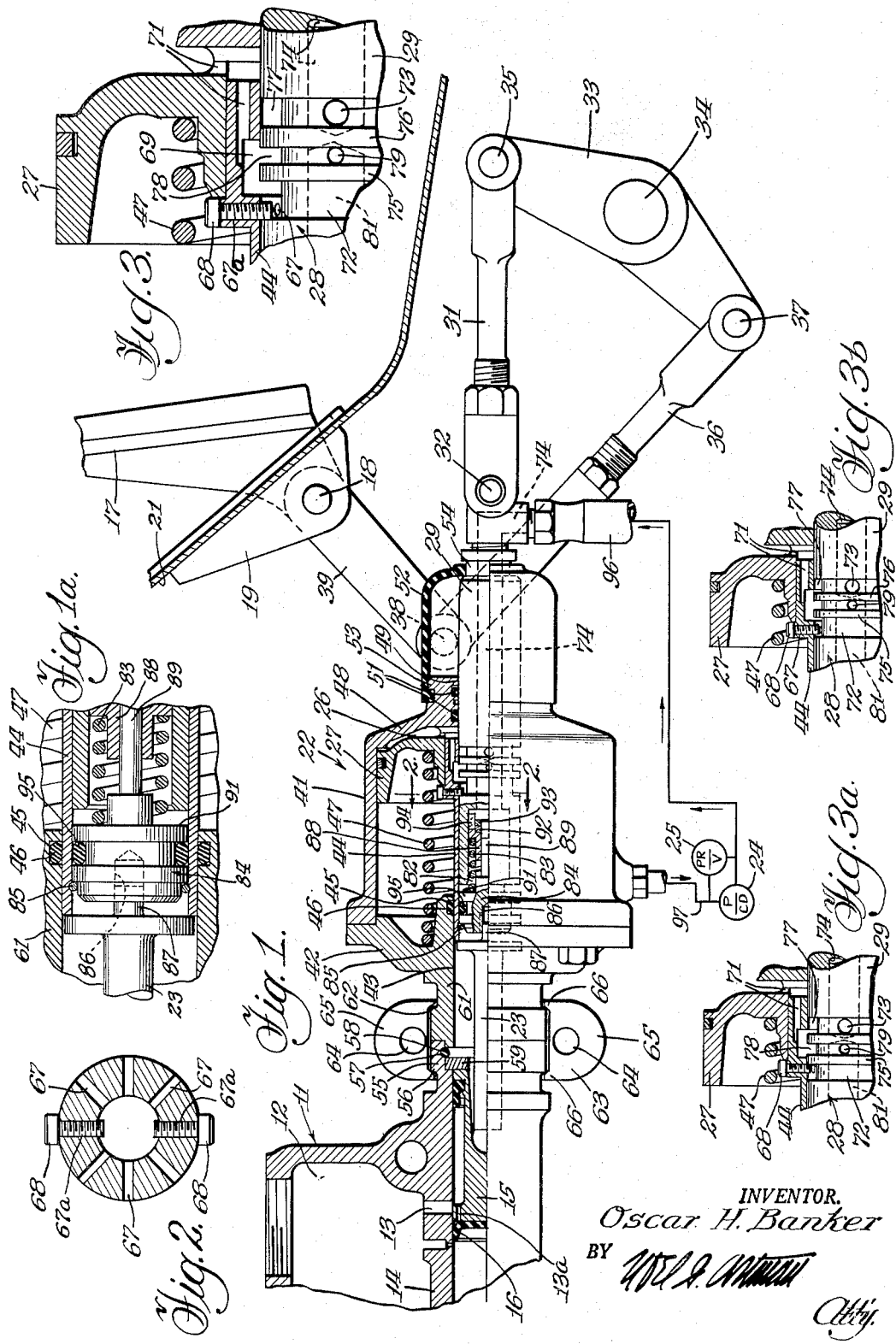
INVENTOR.
Oscar H. Banker
BY
Atty.

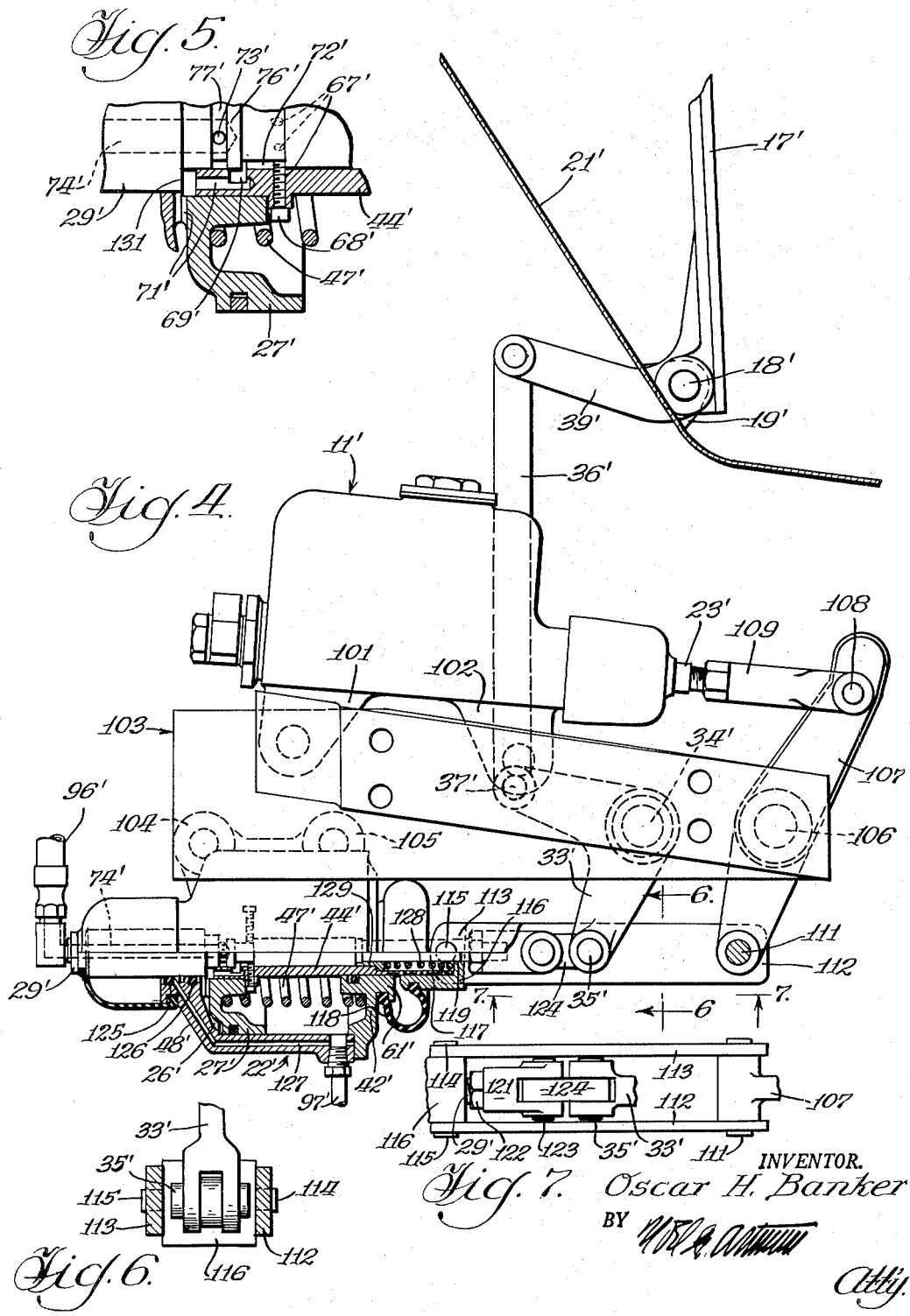

United States Patent Office 2,752,892
Patented July 3, 1956

2,752,892

FOLLOW-UP TYPE BOOSTER WITH REACTION TO ACTUATOR

Oscar H. Banker, Evanston, Ill., assignor to New Products Corporation, Skokie, Ill., a corporation of Delaware Application August 10, 1950, Serial No. 178,655

6 Claims. (Cl. 121—41)

This invention has to do with vehicle braking systems and relates more particularly to such a system employing a pressure booster utilizing fluid from a hydraulic pressure source under control of a manually-operated control member for exerting brake-applying force according to the amount of advancement of the control member, and operating to incur a retractive pressure on the control member in accordance with the amount of advancement thereof to thereby obtain a diminutive force reaction upon the control member in a manner that an operator can sense the magnitude of applied brake pressure.

An important object of this invention is the provision of a self-contained pressure booster device adapted for pressure-exerting assembly with master cylinders of conventional hydraulic brake systems whereby modification of such master cylinders for incorporating them into such assembly is minimized. This invention is an improvement over the disclosure in my co-pending patent application, Serial No. 103,575, filed July 8, 1949, which issued on June 16, 1953, as Patent No. 2,642,165, for Manually-Controlled Power-Operated Vehicle Brake Applying Apparatus wherein the reactive force upon the manually-operated control member is directly exerted by fluid within the orthodox hydraulic brake system. Assembly of such a pressure booster with the master cylinder of the conventional hydraulic brake system involved modification of internal parts of the master cylinder to adapt a work member of the pressure booster unit to be subjected directly to the hydraulic braking fluid. In the present power-actuated braking system the manually-operated control member of the pressure booster unit is subjected to reactive force of fluid under pressure from a separate source of pressure fluid which also exerts an actuating force upon the work member of the booster unit. This arrangement simplifies combining the pressure booster unit with the master cylinder for the establishment of a force-transmitting connection between the work member of the pressure booster and the plunger of the master cylinder, no hydraulic communication between said cylinder and the pressure booster being necessary.

A further object of this invention is the provision of an improved power-actuated braking system employing a pressure booster unit in operating relation with a master cylinder unit in such a fashion that the fluid from the pressure fluid source is completely isolated from the brake fluid of the hydraulic braking system wherefore the fluid at such source may be an inexpensive petroleum lubricating oil without likelihood of contaminating the hydraulic braking fluid.

A further object is the provision in an hydraulic pressure booster of an improved valve-operating member having components of a control valve incorporated into its structure telescopically within a cylindrical valve component in a work member of the unit, and so arranged that such valve control member has no portion of greater diameter than the portion telescopically within the work member wherefore the finished cylindrical surface is susceptible of mass production in a centerless grinding machine.

A still further object is the provision of an improved pressure booster unit utilizing fluid from a pressure source for creating a pressure differential upon opposite ends of a reciprocal work member in such unit, together with a control valve adapted to establish a condition of communication between the pressure source and an end of such work member while concurrently establishing throttled communication between an opposite end of the work member and said source to create a condition of dynamic fluid balance of the work member in an advanced position whereby the work member can be delicately held in such position and will be subject to retraction in a sensitive fashion responsive to even the slightest retraction of the valve control member.

The above and other desirable objects inherent in and encompassed by the invention will be more readily understood from the ensuing description, the appended claims, and the annexed drawings, wherein:

Fig. 1 is a fragmentary vertical sectional view taken in a fore and aft direction through the forward part of a diagrammatically illustrated floor and toeboard of an automotive vehicle driver's compartment and illustrating in association therewith a fragmentary portion of a hydraulic brake system master cylinder and pressure booster unit therefor embodying a preferred form of the present invention, the lower part of such master cylinder and pressure booster unit being shown in side elevation and the upper parts thereof being shown in vertical section.

Fig. 1a is an enlarged sectional view fragmentarily illustrating the left end portion of a sleeve extension on the forward or left end of the piston or work member of the hydraulic booster unit shown in Fig. 1.

Fig. 2 is a transverse sectional view taken on the line 2—2 of Fig. 1, illustrating radial ports in the hub of a piston type work member in the pressure booster unit.

Fig. 3 is an enlarged fragmentary sectional view illustrating channels, passages and ports in the work member and in a rod-like valve control member adjustable axially in said work member.

Fig. 3a is a view similar to Fig. 3 but to smaller scale and illustrating the control valve in an open position for admitting pressure fluid into the high pressure section of the pressure booster chamber.

Fig. 3b is also a view similar to Fig. 3 but to smaller scale and illustrating the control valve in a dynamic fluid balance position for maintaining a selected fluid pressure in the pressure booster.

Fig. 4 is a view taken similarly to Fig. 1 illustrating a modified form of pressure booster unit and the mounting thereof with respect to a master cylinder with which there is an operative connection.

Fig. 5 is an enlarged fragmentary view illustrating passages and ports in the work member of the pressure booster in Fig. 4 and in a manually operable control member axially adjustable in such work member.

Fig. 6 is a transverse sectional view taken on the line 6—6 of Fig. 4.

Fig. 7 is a fragmentary view directed upwardly as illustrated by the line 7—7 in Fig. 4.

A master cylinder 11 fragmentarily upon the left-hand part of Fig. 1 includes the usual reservoir 12 communicating through a port 13 with the interior of the cylinder proper 14 which contains a plunger 15. Conventional brake-operating fluid contained within the reservoir 12 and cylinder 14 is of a character not to accelerate deterioration of a natural rubber sealing cup 16 mounted on the front or left end of the plunger 15. Master cylinder plunger 15 is shown retracted so that fluid in the reservoir 12 can assure filling of the cylinder 14 through the port 13 and the plunger passage 13a past the flexible cup 16. When the plunger 15 is advanced to the left the fluid trapped thereby in the cylinder is compressed and transmits force through conventional lines (not shown) to exert a brake-applying hydraulic force at the wheels of a vehicle upon which the apparatus is installed.

In most installations operating force is applied to the plunger 15 manually through a brake pedal when this pedal is depressed by an operator of the vehicle. In the present installation, however, a pedal 17 constrained for pivotal movement with a shaft 18 in a bracket 19 on the under side of a driver's compartment toeboard 21 is operably connected with a fluid pressure energized pressure booster unit 22 for exerting force through a thrust member 23 against the piston 15 for advancing the same. When fluid under pressure from a source consisting of a constant delivery pump 24 with a by-pass valve 25 is introduced into a high pressure space 26 behind a piston component 27 of a work member 27—44 this work member will be advanced to the left and thereby impart movement to the thrust member 23 with the effect of operating the master cylinder device 11. Introduction of pressure fluid into the high pressure space 26 from the source 24 is under control of a control valve generally designated 28 in Fig. 3. Certain components of this control valve are upon the work member and companion components are upon a rod-like control member 29 which is operably connected with the pedal 17 through an adjustable link 31 pivotally connected with the right end of the member 29 by a pin 32, a double-armed lever 33 mounted upon a fixed pivot 34 and connected with the link 31 by a pivot pin 35, and an adjustable link 36 pivotally connected with an end of the lever 33 by a pin 37 and pivotally connected at 38 with an arm 39 which is constrained by the shaft 18 for pivotal movement with the pedal 17.

Considering now the details of the pressure booster unit, said unit includes a cylinder 41 having a lower pressure end wall 42 containing an opening 43 which serves as a bearing for a rear end portion of a tubular hub portion 44 of the work member 27—44. The periphery of the bearing opening 43 contains an annular groove 45 wherein there is an O-ring 46 to effect a seal between the tubular member 44 and the bearing 43 in which it is slideable. A helical expansion spring 47 reacts between the end wall 42 and the work member piston 27 at all times thereby urging this piston into the retracted position shown adjacently to a high pressure end wall 48 of the cylinder 41. This high pressure end wall contains an axial opening 49 which serves as a bearing for the control member 29 axially slideable therein. A pair of O-rings 51 provide a seal between the bearing opening 49 and said member 29. A collapsible rubber boot 52 is connected between an axial extension 53 of the end wall 48 and a grooved portion 54 of the control member 29 to exclude dust from that part of said member 29 exteriorly of the wall extension 53 and extending to the grooved portion 54.

The master cylinder unit 11 is standard equipment including the detail of an axial extension 55 having an annular shoulder 56 and an internal groove 57 containing a snap-ring 58 behind an annular stop member 59 for the master cylinder plunger 15. An extension 61 of the low pressure end wall 42 is constructed of equal diameter to the master cylinder extension 55 and with a shoulder 62 similar to the shoulder 56 so that these two extensions 55 and 61 can be clamped together by a split collar device consisting of two identical semi-circular elements 63 (one being shown in Fig. 1) adapted to be held together by bolts (not shown) inserted through holes 64 in radial extensions 65 of said elements 63. Tapered semi-annular flanges 66 on the elements 63 wedge against the shoulders 56 and 62 for clamping the master cylinder unit and the pressure booster unit in rigid assembly.

The tubular member 44 forms an axial hub extension of the work member 27 in the pressure booster unit 22. The right end of the work member 27—44 is open wherefore the interior of the member 44 forms a bore extending axially into the work member 27—44 from such right end of the work member. There is a series of circumferentially-spaced fluid equalizer ports 67 communicating between the interior of such bore and the low pressure end of the cylinder 41; see Fig. 2. Two diametrically opposite bores 67a arranged and formed similarly to the ports 67 except for being threaded have cap screws 68 mounted therein to assure that the component 27 of the work member 27—44 will not be forced forwardly relatively to the component 44 by the pressure of fluid in the high pressure chamber section 26. An annular port 69 formed within the axial bore of the work member 27—44 constitutes an inlet port spaced axially of such bore from the fluid equalizer ports 67, and this port 69 communicates between said bore and the high pressure chamber portion 26 by a series of circumferentially-spaced channels 71 of which one is shown in Figs. 1 and 3.

Prior to insertion of the cap screws 68 into the two diametrically opposite holes 67a therefor the control member 29 will be inserted telescopically into the bore of the work member 27—44 so that when the cap screws are later inserted as shown in Figs. 1 and 3 their inner ends will project into an annular channel means 72 in such control member thereby limiting retractive motion of the control member outwardly of such bore.

When the control member 29 is retracted as illustrated in Figs. 1 and 3, a fluid delivery passage port 73 of a fluid delivery passage 74 in such control member is prevented from communication with the annular port 69 by a blocking section 75—76 of such control member of which the component 76 has a sliding sealing fit in the bore of the work member 27—44. Port 73 communicates radially outwardly through the bottom of an annular groove 77 in the control member 29. Another annular groove 78 is formed in the control member blocking section 75—76 and the bottom of this groove 78 contains a plusator port 79 which communicates with an axial fluid transfer passage 81 of the control member. Passage 81 communicates with a spring-receiving recess and pulsator space 82, Fig. 1, in the left end of the control member 29. One end of a helical compression spring 83 in the recess 82 reacts against a closure plug 84 for the left end of the tubular member 44. A snap-ring 85 prevents displacement of the plug 84 from the left or front end of the member 44 as observed in Fig. 1. The walls of a recess 86 in the front end of plug 84 ride telescopically upon a rearward extension 87 of the thrust member 23. A spring-reaction member 88 is axially slideable upon a reduced diameter cylindrical portion 89 of the plug 84 and is cooperable with a shoulder 91 of said plug for holding the spring 83 in a compressed captive condition. A nut 92 and a lock nut 93 therefor upon a threaded section of the reduced diameter portion 89 of the plug 84 limit movement of the member 88 to the right a selective amount thereby determining the amount of compression of the spring 83 and its resistance to further compression. Axial extensions 94 on the right end of the member 88 are abuttable by the bottom of the spring chamber 82 when the control member 29 is advanced to the left. O-ring 95 forms a seal between the plug 84 and the inner periphery of the work member component 44 to prevent leakage of fluid from the chamber 82. This seal also prevents leakage onto the inner periphery of the bearing opening 43 about the thrust member 23 and thus prevents co-mingling of the fluid in the pressure booster unit with fluid in the master cylinder unit 11.

A flexible conduit 96 communicates between the discharge side of the constant delivery pump 24 and the fluid delivery passage in the control member 29. Fluid at low pressure is drained off from the low pressure section of the cylinder 41 through a conduit 97 leading to the inlet side of the pump 24.

*Operation of the first embodiment*

Assuming that the constant delivery pump 24 is operating and that the manually-operable control member 29 is in the retracted position shown and that the other parts of the apparatus are in the position shown in Figs. 1 and 3, fluid delivered by the pump through the conduit 96 into the fluid delivery passage 74 cannot escape from the port 73 and groove 77 because of the groove 77 being out of registry with the inlet port 69. Consequently fluid will be forced through the pressure relief valve 25 back to the inlet side of the pump through a portion of the conduit 97 while a high pressure condition is maintained in the conduit 96, fluid delivery passage 74 and the groove 77.

When the operator desires to apply the vehicle brakes he will press forwardly (to the left) upon the pedal 17 thereby causing this pedal, the shaft 18 and the arm 39 to rock counterclockwise. A thrust force is thus exerted through the link 36 for pivoting the lever 33 counterclockwise about the fixed pivot 34 wherefore the link 31 is caused to advance the valve control member 29 to the left. Upon advancement of the blocking section component 76 beyond the right edge of the annular port 69 communication will be had by the groove 77 with such port 69 so that fluid under pressure will flow through the channel 71 into the high pressure chamber section 26. Concurrently the forward component 75 of the blocking section 75—76 will be moved into contiguity with the forward edge of the annular port 69 and may actually be telescoped into that portion of the bore in the work member component 44 forwardly of the port 69 as illustrated in Fig. 3a, thus blocking off communication between the low pressure chamber section between the work member and the low pressure wall 42 and the high pressure chamber section 26 through the ports 67. The fluid under pressure in the high pressure chamber section 26 will then be effective for advancing the work member 27—44 to the left incident to compressing the spring 47 and to pressing the forward end of the tubular component 44 against the back end of the thrust member 23 to cause advancement of the master cylinder plunger 15 in concert with the work member 27—44. The amount of this advancement and consequently the magnitude of the pressure in the master cylinder 14 for applying the vehicle brakes will be in accordance with the amount of manual advancement of the control member 29 since subsequent to an advancement of the member 29 the work member 27—44 will advance until the trailing edge of the annular port 69 approaches very close to the trailing edge of the blocking section component 76 concurrently with the leading edge of the annular port 69 occupying a position slightly forwardly of the leading edge of the blocking section component 75. When this condition prevails as illustrated in Fig. 3b there will be a status of dynamic fluid pressure balance during which the fluid delivered from the groove 77 past the trailing edge of the blocking section component 76 into the annular port 69 is permitted to escape at an equal flow rate from the annular port 69 between the leading edge of the blocking section component 75 and the leading edge of the annular port 69 thence through the fluid equalizer ports 67 into the low pressure chamber section back to the pump. Thus a predetermined pressure is maintained in the high pressure chamber section 26 to cause a static condition of the work member 27—44. This condition can prevail because the distance between the trailing and leading edges of the blocking section 75—76 is slightly less than the distance between the leading and trailing edges of the annular port 69.

During the condition of dynamic fluid balance which maintains the work member 27—44 at a desired advanced position this work member can be caused to advance further to effect more firm engagement of the brakes by simply further advancing the control member 29 an amount correlated with the further braking action desired. Responsively to this further advance of the control member 29 the blocking section component 75 will stop further flow from the port 69 to the low pressure section through the ports 67 so that delivery into the port 69 from the groove 77 will pass through the channel 71 into the high pressure chamber section 26. Ensuing advance of the work member 27—44 will almost instantaneously reestablish the dynamic fluid balance condition so that the work member will remain in its newly advanced position.

Any degree of retraction of the work member 27—44 with corresponding diminution in the amount of brake application can be obtained by allowing the control member 27 to retract under the force of fluid under pressure which is delivered through the port 79 and channel means 81 into the spring-receiving recess 82. Fluid trapped in the recess 82 by the closure cap 84 reacts upon the left end of the control member 29 thereby urging this control member retractively with a force corresponding to the pressure of fluid in the port 69, channel 71 and in the high pressure chamber section 26. Consequently there will be a reactive force upon the pedal 17 against the operator's foot in proportion to the amount of pressure in the high pressure chamber section 26 and according to the amount of advancement of the work member 27—44. Thus the operator will be apprised of the amount of brake force being applied to the vehicle brakes by a force proportional to but less than that exerted by fluid in the chamber section 26 against the work member 27—44.

Incident to let-up of force by the operator's foot upon the pedal 17 the fluid in the spring-receiving recess 82 will move the control member 29 and the pedal 17 retractively an amount permitted by the operator. When this occurs during the status of dynamic hydraulic balance while the blocking section 75—76 is midway between the trailing and leading ends of the annular port 69, the blocking section component 76 will be caused to block off communication between the groove 77 and the port 69 while the blocking section 75 departs rearwardly from the leading edge of the port 69 to permit discharge from the high pressure chamber section 26 through the fluid equalizer ports 67 into the low pressure chamber section pursuant to the spring 47 retracting the work member structure 27—44. Retractive movement of the work member structure will continue until the condition of dynamic fluid balance is again re-established to maintain the work member structure at a new retracted position causing brake engagement at a selected decreased pressure.

When the operator wishes the brakes to be completely released he will completely release the pedal 17 permitting the pressure of fluid in the chamber 82 and the springs 83 and 47 to return the parts to the positions illustrated in Figs. 1 and 3.

In Fig. 1 it will be noted that the right end of axial extensions 94 upon the slideable sleeve-like element 88 are spaced less distantly from the bottom of the spring-receiving recess 82 than the trailing edge of the blocking section component 76 is spaced rearwardly of the trailing edge of the annular inlet port 69. Therefore following an initial preliminary advancement of the control member 29 the bottom of the spring-receiving recess 82 will abut the ends of the axial extensions 94 prior to the introduction of fluid from the annular groove 77 into the annular port 69. Upon abutment of the control member with the axial extensions 94 the spring 83 wil resist further advancement of this control member. This spring 83 is easily compressed however but its resistance to further advancement of the control member is readily detectable by the vehicle operator so that he is apprised when the brake pedal has been depressed an amount in readiness to commence fluid energization of the booster unit 22. The amount of force initially exerted by the captive spring 83 when the member extensions 94 are first encountered by the control member can be pre-selected by changing the degree of compression of the spring by means of the nut 92 and lock nut 93.

It will be noted that the fluid introduced into the spring-receiving chamber 82 for reacting retractively upon the front end of the control member 29 is trapped within this chamber by the cap 84 which is held in the forward end of the tubular component 44 of the work member by a snap-ring 85. Sealing means in the form of an O-ring 95 prevents escape of this fluid forwardly into the annular space between the periphery of the bearing opening 43 and the thrust member 23. Because of the tubular component 44 of the work member sliding against the bearing 43 which is separated from the inner periphery of the cylinder proper 14 by the annular stop member 59 the rubber seals as 16 associated with the master cylinder plunger 15 never come in contact with a surface contacted by the work member thereby minimizing the likelihood of any transfer of oil from the pressure booster unit into position for contacting the rubber cup and seals of the master cylinder.

In the event of fluid pressure failure for the booster unit 22, the operator can manually apply the brakes by advancing the left end of the control member 29 into engagement with the cap 84 and thus exerting pressure through this cap, the snap-ring 85 and the tubular component 44 of the work member against the thrust member 23 for advancing the master cylinder plunger. Meanwhile the work member component 44 will advance with the control member 29 incident to sliding in the piston component 27 so the latter does not oppose manual application of the brakes.

Second embodiment, Figs. 4, 5, 6 and 7

Inasmuch as many parts in the second embodiment have corresponding parts in the first embodiment described above, these corresponding parts in the second embodiment are designated by the same respective reference characters with the addition of a prime as an expedient for avoiding prolixity in this description. In this second embodiment the master cylinder 11' has apertured ears 101 and 102 depending from its casing to facilitate mounting of the unit upon a bracket structure 103 which is suitably secured to an under part of the vehicle body. This bracket structure also serves as a mounting for the pressure booster unit 22' of which the casing has apertured ears 104 and 105 which are secured to such bracket structure. The lever 33' corresponding to the lever 33 of the first embodiment is in the form of a more pronounced bell crank and the fixed pivot pin 34' for this lever is mounted in the bracket structure 103. The bracket structure 103 also carries a fixed pivot pin 106 for a lever 107 of which the upper end is pivotally connected at 108 wtih a link 109 which is connected with the rear end of a master cylinder plunger thrust member 23'. The lower end of the lever 107 is pivotally mounted upon a pin 111 which extends between and is mounted in laterally-spaced links 112 and 113; Figs. 4, 6 and 7. These links 112 and 113 extend forwardly into pivotal connection with trunnions 114 and 115 projecting oppositely from a connecting head 116. This connecting head 116 is threaded onto a rear end portion of the tubular work member component 44' as indicated at 117. An annular expansible boot 118 is connected between an extension 61' of the low pressure end wall 42' and said connecting head.

A hole 119 in the connecting head 116 telescopically receives a reduced diameter rear end portion of the control member 29'. Rearwardly of the connecting head this reduced end portion of the control member 29' is threaded as illustrated in Fig. 7 and a bifurcated head 121 is turned onto such threaded portion and locked in position thereon by a lock nut 122. Head 121 carries a pin 123 which pivotally connects with one end of a link 124 of which the other end is pivotally connected with the pin 35' of the bell crank lever 33'.

An annular groove 125 forwardly of a sealing O-ring 126 in the high pressure end wall 48' of the booster unit casing catches any oil leaking past the O-ring 126 and such leakage is fed through a groove 127 within the casing wall into the return line 97' for the pump (not shown) which would correspond to the pump 24 in Fig. 1.

Operation of the second embodiment

With the parts as illustrated in the drawing the brake pedal 17' is retracted and a spring 128 reacts against the connecting head 116 and a flanged ring 129 for holding the control member 29' retracted forwardly or to the left as viewed in Fig. 4. Fluid under pressure is maintained in the delivery conduit 96' and the fluid delivery passage 74' in the control member. Inasmuch as the annular groove 77' with which the fluid delivery passage 74' communicates through the port 73' is in sliding sealing relation with a section of the work member structure bore forwardly of the annular port 69' as viewed in Fig. 5, this fluid under pressure now has no effect upon the pressure booster unit.

Upon manual depression of the pedal 17' to cause counterclockwise pivoting thereof the linkage connecting this pedal with the rear end of the control member 29' will pull such control member rearwardly while compressing the spring 128 which provides a slight resistance for the operator to work against. Upon movement of the control member rearwardly far enough for the groove 77' to communicate with the fluid in the port 69' fluid will be admitted through the channel 71' into the high pressure chamber section 26' of the booster unit. Thereupon the work member structure 27'—44' will be advanced rearwardly of the vehicle an amount corresponding to the distance the trailing edge of the blocking section 76' is moved beyond the trailing edge of the annular port 69'. Meanwhile the pressure of fluid reacting upon an annular shoulder 131 of the control member 29' will urge this member retractively with a force proportional to the pressure of fluid in the high pressure chamber section 26' and proportional to the amount of brake-applying force exerted by the work member component 44' through the connecting head 116, links 112 and 113, lever 107, link 109, thrust member 23' and a fluid column (not shown) between the master cylinder unit 11' and the vehicle brakes (not shown). Additional brake pressure is incurred by further depression of the pedal 17' and corresponding movement of the control member 29' to the right to establish communication between the groove 77' and the annular port 69' and cause admission of additional fluid into the high pressure chamber section 26' to cause further advancement of the work member structure.

When it is desired to partially release the brakes the pedal 17' will be partially released whereupon the spring 128 will be effective for retracting the control member 29' to the left for withdrawing the leading edge of the blocking section 76' from the leading edge of the annular port 69' to permit leakage of fluid from the high pressure chamber section 26' through the channel means 71', port 69', channel means 72' and equalizer ports 67' into the low pressure end of the booster device between the low pressure wall 42' and the piston component 27' of the work member structure. As this leakage occurs the spring 47' retracts the piston component 27' until the leading edge of the annular port 69' comes into registry with the leading edge of the annular blocking section 76' whereupon the work member structure will come to rest under a condition imposing less pressure upon the master cylinder unit 11' and correspondingly less braking pressure upon the vehicle brakes.

Complete release of the vehicle brakes is accomplished by completely releasing the pedal 17' conventionally wherefore the spring 128 can re-establish the position of the control member 29' illustrated in the drawings pursuant to which communication is re-established through the ports 67′, channel means 72′, inlet port 69′ and the channel means 71′ between opposite ends of the work member piston component 27′ to enable the spring 47′ to return this piston to the brake-releasing position shown in the drawings.

Having thus described a limited number of embodiments of the invention with the view of clearly and concisely illustrating the same, I claim:

1. A hydraulic pressure booster comprising a fluid receiving chamber having opposite relatively high pressure and low pressure end walls containing respective bearing openings, an axially reciprocable work member in said chamber and dividing said chamber into high and low pressure sections, said work member comprising a sleeve having an abutment intermediate its ends and a wall extending outwardly from the sleeve across the chamber, said wall having a hub slidable on said sleeve toward and away from the abutment, resilient means in the low pressure section urging the wall and hub away from the abutment, the fluid pressure in the high pressure section being adapted to urge the wall and hub toward the abutment, said sleeve having a recess facing the high pressure end wall of the chamber, said sleeve containing ports spaced axially thereof in said recess and communicating respectively with said chamber sections, a valve-operating member extending through the high pressure end wall bearing into said recess for relative axial advancing and retracting movement therein, said valve-operating member containing a fluid-delivery passage having a port leading radially from said passage and also containing a channel adapted to intercommunicatively bridge said sleeve ports to provide communication between the chamber sections when said operating member is retracted, the port in said operating member being open to the high pressure chamber section port incident to advancement of the operating member relative to the sleeve a distance displacing the channel from the intercommunicative bridging relation with the axially-spaced ports, fluid introduced into the high pressure chamber through the fluid delivery passages and the ports being adapted to cause advancement of the wall and sleeve, and means on the valve operating member exposed to the high pressure fluid to urge the operating member retractively from the advanced position.

2. A hydraulic pressure booster comprising a fluid-receiving chamber having opposite relatively high pressure and low pressure end walls containing respective bearing openings, a work member dividing said chamber into a relatively high pressure section adjacent the high pressure end wall and into a relatively low pressure section adjacent the low pressure end wall, said work member being advanceable toward the low pressure end wall and retractible toward the high pressure end wall, said work member having an open-ended cylindrical recess with the open end of such recess facing outwardly of said member toward the high pressure end wall of the chamber, said work member containing ports spaced axially thereof in said recess, one of said ports being a fluid-equalizer port and communicating with the low pressure chamber section, the other of said ports being an inlet port nearer to the open end of said recess and communicating with the high pressure chamber section, a valve-operating member having a cylindrical section extending through the high pressure end wall bearing into said recess for relative axial movement therein alternately advancively or retractively, said cylindrical section of the operating member being of constant diameter equal to that of such end wall bearing and of the cylindrical recess to facilitate the forming of a sealing sliding fit therewith, the end of said operating member extending into the recess cooperating with such recess in forming a fluid-receiving pulsator space, said operating member containing a fluid-delivery passage having a port leading radially from said passage at a position between the inlet port of the work member and the open end of the recess when the operating member is retracted, said operating member containing a channel spaced inwardly of the recess from the fluid-delivery port and adapted to intercommunicatively bridge the work member ports to provide fluid transfer communication between the chamber sections when said operating member is retracted, there being a section of the valve-operating member between the fluid-delivery passage port and said channel for at least substantially blocking intercommunication between the axially spaced ports of the work member incident to advancement of the operating member relatively to the work member, the operating member fluid-delivery port being placed in communicative registry with the work member inlet port pursuant to such relative advancement of the work member, there being a pulsator port in said operating member, said pulsator port being intercommunicative through said valve-operating member with the pulsator space and being disposed in communicative registry with a port leading to the high pressure chamber section during said relative advancement of the operating member, thereby establishing communication between the high pressure chamber section and said pulsator space whereby the pressure of fluid in said space is operable upon the inner end of the operating member to urge the same retractively from the position of relative advancement with respect to the work member.

3. The combination set forth in claim 2 wherein the section of the work member between the fluid-delivery port and said channel for blocking communication between the axially spaced ports of the work member spans a distance axially of the work member slightly less than the distance spanned by the work member inlet port thereby providing for throttled communication between the chamber sections through said ports during registry of the fluid-delivery port with the inlet port of the work member to create a condition of dynamic fluid balance of the work member axially of the chamber.

4. A hydraulic pressure booster comprising a fluid-receiving chamber having opposite ends, a work member movable axially in said chamber and dividing the same into a relatively high pressure section adjacent to one end and a relatively low pressure section adjacent the opposite end, said work member having an axial recess bore with an open end facing the high pressure end of the chamber and ports in said bore and communicating respectively with said chamber sections, the port communicating with the high pressure section being an inlet port therefor, a manually-operated control member projecting axially through the high pressure chamber section into the work member bore in sliding sealing relation therewith and forming a pulsator chamber between the opposite end of the recess and an inner end of such control member, said manually-operated control member containing a fluid-delivery passage having a port leading radially therefrom at a position between said inlet port and the high pressure end of said chamber when said control member is retracted outwardly in the work member bore, means for closing the fluid-delivery passage port during such retraction, said control member having channel means spaced axially from the port thereof and concurrently communicative with the work member ports while the control member is retracted, the fluid-delivery passage port being placed in communicative registry with the work member high pressure section port pursuant to advancement of the control member relatively to the work member, and there being a section of said control member between the fluid-delivery passage port and said channel means for restrictive intercommunication between the work member ports incident to such advancement of the control member, but said control member section spanning a distance axially of said member slightly less than the extent of the inlet port axially of the control member and thereby providing for throttled communication between the chamber sections through the work member spaced ports during registry of the fluid-delivery passage port with the work member inlet port to create a condition of dynamic fluid balance of the work member axially of the chamber, and a transfer passage communicating through the valve control member with the pulsator chamber and having a port communicative with the high pressure chamber inlet ports.

5. In a hydraulic pressure booster, a fluid-operated work member movable axially in opposite directions and having a recess bore extending axially thereinto, said recess bore having an open end at one end of the work member and having an opposite closed end and axially spaced ports in said bore, one of said ports being a fluid-equalizer port communicating with the one end of the work member and the other port being an inlet port communicating with the other end of the work member; a manually-operated control member reciprocable in said bore in sliding sealing relation therewith and having an inner end in opposed relation with the closed end of said bore to form a pulsator chamber therewith, said control member having channel means adapted to communicate between the axially spaced ports, said control member having a fluid-delivery passage and a port leading from said passage adapted for communicative registry with the work member inlet port while said channel means communicates between said axially spaced ports of the work member, said control member being placeable in an axially retracted position wherein the delivery passage port is withdrawn from registry with the work member inlet port while the channel means bridges the axially spaced ports and being advanceable from said retracted position to place the delivery passage port in communicative registry with the work member inlet port, said control member having a throttling section adapted to throttle the communication between said axially spaced ports during such advance of the control member, and said control member containing a transfer passage communicating with the pulsator chamber and having a port communicating through said throttling section with the work member inlet port.

6. In a hydraulic pressure booster, a fluid-operated work member movable axially in opposite directions and having a recess bore extending axially thereinto, said recess having a closed inner end at one end of the work member and an open end at the other end of such work member and axially spaced ports in said bore, one of said ports being a fluid-equalizer port communicating with the one end of the work member and the other port being an inlet port communicating with the other end of the work member; a manually-operated control member axially movable in said bore in sliding sealing relation therewith alternately between an advanced position and a retracted position, said control member having an inner end in opposed relation with the inner end of said bore to form a pulsator chamber therewith in said bore, said control member having channel means adapted to communicate between the axially spaced ports when such member is in the retracted position but adapted to communicate with only the fluid-equalizer port when the control member is in the advanced position, said control member also having a fluid-delivery passage with a port disposed in communicative registry with only the work member inlet port when the control member is in the advanced position but communicative with neither of said axially spaced ports when the control member is in the retracted position, means operable under control of said control member for establishing throttled communication of the work member inlet port concurrently with the fluid-delivery passage port and said channel means when the control member is in an intermediate position between the advanced and retracted positions, and a transfer passage communicating through the valve control member with the pulsator chamber and having a port communicative with the high pressure chamber inlet ports.

References Cited in the file of this patent

UNITED STATES PATENTS

| | | |
|---|---|---|
| 1,604,545 | Bragg | Oct. 26, 1926 |
| 1,653,785 | Sauveur et al. | Dec. 27, 1927 |
| 1,809,069 | Sanford | June 9, 1931 |
| 1,934,719 | Knox | Nov. 14, 1933 |
| 2,007,423 | Davis | July 9, 1935 |
| 2,130,799 | Hofstetter | Sept. 20, 1938 |
| 2,393,585 | Boynton et al. | Jan. 29, 1946 |
| 2,451,334 | Groves | Oct. 12, 1948 |
| 2,458,803 | Stelzer | Jan. 11, 1949 |
| 2,475,105 | Mitton | July 5, 1949 |
| 2,507,674 | Mogk | May 16, 1950 |

FOREIGN PATENTS

| | | |
|---|---|---|
| 295,290 | Great Britain | Oct. 31, 1929 |